United States Patent [19]

Catlow

[11] Patent Number: 4,850,090
[45] Date of Patent: Jul. 25, 1989

[54] METHOD OF MANUFACTURE OF AN AXIAL FLOW COMPRESSOR STATOR ASSEMBLY

[75] Inventor: Ronald Catlow, Derby, England
[73] Assignee: Rolls-Royce plc, London, England
[21] Appl. No.: 192,625
[22] Filed: May 11, 1988
[30] Foreign Application Priority Data

Jul. 22, 1987 [GB] United Kingdom ................. 8717285

[51] Int. Cl.⁴ .................. B21K 3/04; B23P 15/04
[52] U.S. Cl. .................. 29/156.8 R; 29/156.8 CF; 29/156.8 B; 29/156.8 P; 29/156 T
[58] Field of Search .............. 29/156.8 R, 156.8 H, 29/156.8 P, 527.1, 23.5, 156.4 R, 598, 596, 156.8 CF, 156.8 B, 156.8 T; 181/214; 416/188; 418/8; 428/457

[56] References Cited

U.S. PATENT DOCUMENTS

| | | | |
|---|---|---|---|
| 2,983,992 | 5/1961 | Bloomberg | 29/156.8 R |
| 3,182,955 | 5/1965 | Hyde | 29/156.8 H |
| 3,505,717 | 4/1970 | Palzreyman | 29/156.8 R |
| 4,016,636 | 4/1977 | Schneider et al. | 29/156.8 R |
| 4,126,933 | 11/1978 | Anderson et al. | 29/598 |
| 4,676,722 | 6/1987 | Marchal et al. | 416/188 |
| 4,737,417 | 4/1988 | Mushardt et al. | 29/156.8 R |

Primary Examiner—Timothy V. Eley
Assistant Examiner—Peter Dungba Vo
Attorney, Agent, or Firm—Cushman, Darby & Cushman

[57] ABSTRACT

A method of manufacturing an axial flow compressor stator assembly in which a plurality of aerofoil cross-section stator vanes having divergent inner and outer extents are encapsulated in a low melting point alloy so that their extents protrude from the alloy. The vanes are encapsulated in the same relationship with respect to each other which they would assume in a compressor. A moulding material is then moulded around the radially inner and outer extents to define arcuate bridging member which interconnect adjacent stator vanes. A stiffening member is bonded to the bridging piece interconnecting adjacent radially outer stator vane extents and the whole assembly heated to melt the encapsulation alloy.

14 Claims, 2 Drawing Sheets

METHOD OF MANUFACTURE OF AN AXIAL FLOW COMPRESSOR STATOR ASSEMBLY

This invention relates to a method of manufacture of an axial flow compressor stator assembly and in particular to the manufacture of such an assembly which is at least partially formed from composite materials.

The comparatively low temperatures at which at least the upstream regions of gas turbine engine compressors operate has permitted the use of composite materials, for instance fibre reinforced resins, in their construction. However it has been found in certain compressor stators that structural failures have occured in highly stressed areas. It is believed that these failures have been brought about by a lack of rigidity in the structure and a dependence in the highly stressed areas upon the shear strength of adhesive joints.

It is an object of the present invention to provide a method of manufacture of a more rigid compressor stator structure in which such adhesive joints in structurally critical regions is substantially avoided.

According to the present invention, a method of manufacturing a stator assembly suitable for an axial flow compressor having a plurality of radially extending aerofoil stator vanes comprises the steps of fixing by releasable fixing means a plurality of pre-formed aerofoil cross-section stator vanes in the same relationship they would assume with respect to each other in said compressor, each of the radially inner and outer extents of said stator vanes being of divergent configuration, moulding a composite material around said divergent radially inner and outer extents to define first and second arcuate bridging members respectively, interconnecting the radially outer and inner extents of adjacent stator vanes, bonding a stiffening member to the outer surface of said bridging member, interconnecting the radially outer extents of said stator vanes, and releasing said fixing means.

The invention will now be described, by way of example, with reference to the accompanying drawings in which.

Figure 1:
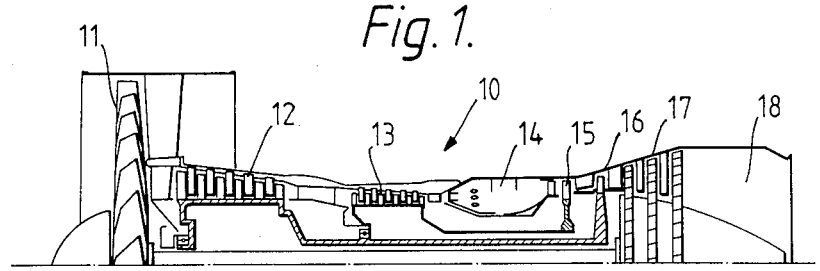
FIG. 1 is a sectioned side view of the upper half of a ducted fan gas turbine engine incorporating compressor parts manufactured in accordance with the method of the present invention.

With reference to FIG. 1, ducted fan gas turbine engine generally indicated at 10 is of conventional construction and comprises, in axial flow series, a ducted fan 11, an intermediate pressure compressor 12, a high pressure compressor 13, combustion equipment 14, a high pressure turbine 15 drivingly attached to the high pressure compressor 13, an intermediate pressure turbine 16 drivingly attached to the intermediate pressure compressor 12, a low pressure turbine 17 drivingly connected to the ducted fan 11, and a propulsion nozzle 18.

The engine 10 functions in the conventional manner with the fan 11 providing both propulsive thrust and delivering compressed air to the intermediate pressure compressor 12. The intermediate pressure compressor 12 further compresses the air before delivering it to the high pressure compressor 13 where it is compressed still further. The compressed air is then directed into the combustion equipment 14 where it is mixed with fuel and the mixture combusted. The resultant hot gases then expand through the high, intermediate and low pressure turbines 15,16 and 17 before exhausting through the nozzle 18 to provide propulsive thrust.

Figure 2:
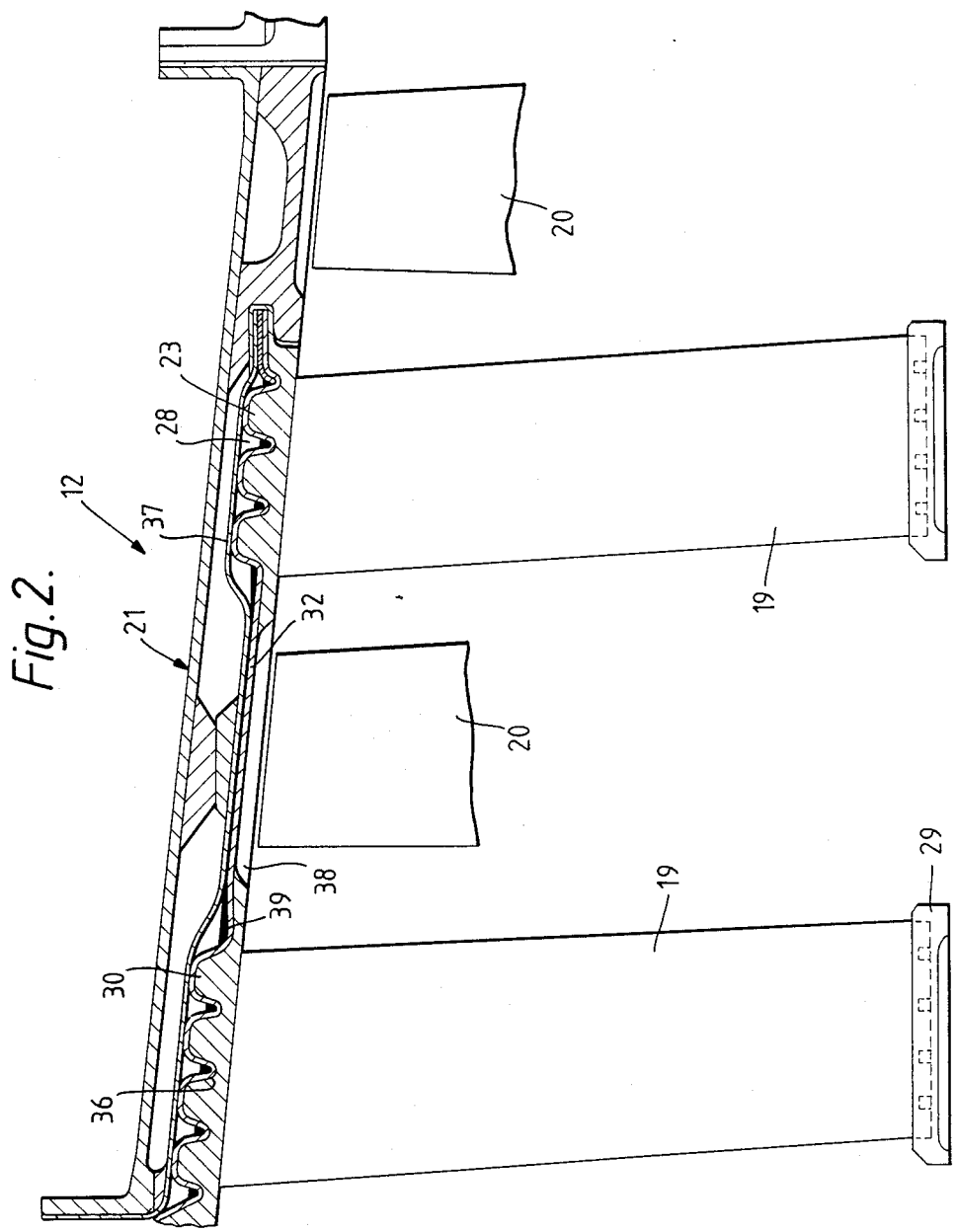
FIG. 2 is a sectioned side view of a portion of the intermediate pressure compressor of the ducted fan gas turbine engine shown in FIG. 1.

The present invention is particularly concerned with the method of construction of the stator portions of the intermediate pressure compressor 12, details of which can be seen more clearly if reference is made to FIG. 2.

The intermediate pressure compressor 12 comprises alternate annular arrays of aerofoil cross-section stator vanes 19 and rotor blades 20, two arrays of each of which can be seen in FIG. 2. The stator vanes 19 and rotor blades 20 are enclosed by a generally frusto-conical shaped casing 21 which serves to contain the air operationally passing through the intermediate pressure compressor 12 and additionally supports the annular arrays of stator vanes 19.

Figure 3:
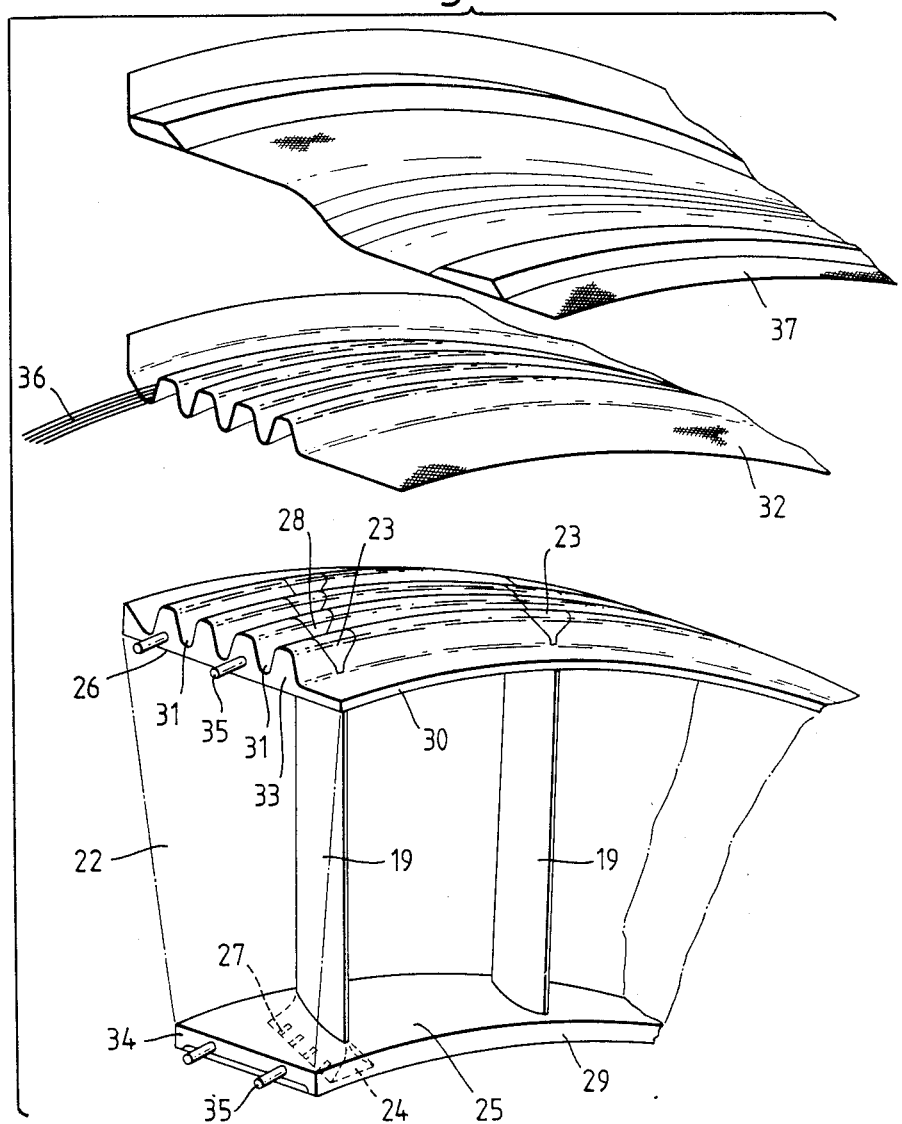
FIG. 3 is an exploded view of a portion of the intermediate pressure compressor of the ducted fan gas turbine engine shown in FIG. 1 depicting the mode of compressor construction.

The stator vane 19 assemblies are manufactured in groups of two arrays in accordance with the method of the present invention and the way in which this is achieved can be more readily understood if reference is now made to FIG. 3.

Initially a group of, for example 3, of stator vanes 19 are encapsulated in a low melting point alloy 22 (defined by interrupted lines in FIG. 3) so that they are fixed relative to each other in the same relationship which they will ultimately have in the intermediate pressure compressor 12. However the radially inner and outer extents 24 and 23 respectively of each stator vane 19, which extends are of divergent configuration, are not so encapsulated and are left exposed. Additionally the alloy 22 is so moulded during encapsulation that its resultant radially inner and outer faces 25 and 26 respectively are of arcuate configuration.

The stator vanes 19 are formed from a fibre reinforced resin, such as silicon carbide reinforced cured epoxy resin. It will be appreciated however that they could be constructed from other suitable materials including metals.

The encapsulated vanes 19 are then machined so that their radially inner and outer extents 24 and 23 are provided with several circumferentially extending slots 27 and 28 respectively. The slots 27 in the radially inner extents 24 are of rectangular cross-sectional shape. However the slots 28 in the radially outer extents 23 are of generally radially outwardly flared U-shaped cross-sectional shape.

The thus machined and encapsulated vanes 19 are then placed in a die (not shown) having faces which confront but are spaced apart from the radially inner and outer encapsulation material faces 25 and 26. Moreover the die face which confronts the outer encapsulation face 26 is provided with circumferential grooves which correspond in form with the cross-sectional shape of the slots 28 in the radially outer stator vane extents 23.

The spaces between the die and the radially inner and outer encapsulation material faces 25 and 26 are then filled with a mixture of chopped silicon carbide fibres dispersed in a matrix of uncured epoxy resin. The assembly is then heated to an intermediate temperature to partially cure the epoxy resin after which the die is removed. This then defines a structure of the kind shown in FIG. 3 in which adjacent stator vanes 19 are interconnected by first and second radially arcuate bridging members 29 and 30 respectively. As will be seen from FIG. 3 the first radially bridging member 29 is of generally rectangular cross-sectional shape with the slots 27 in the radially inner stator vane extents 24 assisting in the keying of the extents 24 to the bridging piece 29. However the second radially bridging member 30 is provided with circumferential grooves 31 which correspond in configuration with and are contiguous with the slots 28 in the radially outer stator vane extents 23. Thus continuous circumferential grooves 31 are provided in the bridging member 30 and the radially outer vane extents 23.

It will be seen therefore that the divergent forms of the radially outer and inner stator vane extents are instrumental in providing a strong mechanical key between each stator vane 19 and the bridging member 29 and 30.

In order to provide the necessary stiffness to the assembly of stator vanes 19, woven silicon carbide fibre cloth 32 which has been pre-impregnated with an epoxy resin is bonded to the radially outer surface of the bridging member 30. An effective bond is achieved between the impregnated cloth 32 and the bridging member 30 by pre-forming the impregnated cloth 32 to the appropriate configuration as shown in FIG. 3 by the use of suitable dies (not shown). More than one layer of cloth 32 may be employed if so desired.

The whole assembly is then loaded in compression and heated in order to fully cure the epoxy resin matrix material in the assembly.

After curing, the end faces 33 and 34 of the first and second radially bridging members 30 and 29 respectively are machined flat and drilled to provide locations for dowelling pieces 35. A number of stator vane 19 assemblies similar to that shown in FIG. 3 are then bonded together by a suitable adhesive with the dowels 35 locating in corresponding holes (not shown) provided in adjacent bridging pieces 29 and 30 until a complete annulus of stator vanes 19 is formed.

If additional stiffness of the resultant stator vane 19 annulus is required, continuous fibre 36 of silicon carbide may be dry wound into the cloth 32 covering circumferential grooves 31 provided in the bridging members 30. The wound fibre is subsequently impregnated with an appropriate epoxy resin.

The second radially bridging members 30 are then covered by and adhesively bonded to two similar semicircular outer skins 37, a portion of one of which can be seen in FIG. 3.

Finally the temperature of the assembly is raised sufficiently to melt the alloy 22 encapsulating the vanes 19.

Although the present invention has been described with reference to the manufacture of a single stator vane 19 annulus, more than one annulus could be produced if so desired. Thus it will be seen from FIG. 2 that in the manufacture of two annular arrays of stator vanes 19, a common impregnated cloth 32 and outer skin 37 are employed with a layer 39 of wound and resin impregnated fibres interposed between them. The advantage of this arrangement is that the impregnated cloth 32 and outer skin 37 cooperate to define that portion of the casing of the intermediate pressure compressor 12 which surrounds one of the annular arrays of rotor blades. Indeed the impregnated cloth 32 and outer skin 37 could be so configured as to define a cavity 38 for a suitable abradable lining.

Although the present invention has been described with reference to the manufacture of a structure generally formed from silicon carbide fibre reinforced epoxy resin, it will be appreciated other materials could be employed if so desired.

I claim:

1. A method of manufacturing a stator vane assembly having a plurality of radially extending aerofoil cross-section stator vanes suitable for an axial flow compressor comprising the steps of, pre-forming a plurality of aerofoil cross-section stator vanes each with radially inner and outer extents of divergent configuration, fixing by releasable fixing means the plurality of pre-formed aerofoil cross-section stator vanes in the same relationship they would assume with respect to each other in said compressor, moulding a composite material around said divergent radial inner and outer extents of the plurality of aerofoil cross-section stator vanes to define first and second arcuate bridging members, said first and second arcuate bridging members respectively interconnecting the radially inner and outer extents of adjacent stator vanes, bonding a stiffening member to the outer surface of said second bridging member interconnecting the radially outer extents of said stator vanes and releasing said fixing means.

2. A method of manufacturing a stator vane assembly as claimed in claim 1 wherein said radially inner and outer extents of each stator vane are provided with circumferentially extending slots.

3. A method of manufacturing a stator vane assembly as claimed in claim 2 wherein said arcuate bridging member interconnecting adjacent radially outer stator vane extents is so moulded as to define circumferentially extending grooves which are of the same cross-sectioned configuration as and contiguous with said circumferentially extending slots in said radially outer stator vane extents.

4. A method of manufacturing a stator vane assembly as claimed in claim 3 wherein fibre is wound in said circumferential grooves in said bridging members whereupon said wound fibres are impregnated with a matrix material.

5. A method of manufacturing a stator vane assembly as claimed in claim 2 where said slots in the radially outer extent of each stator vane are each of generally U-shaped cross-sectional configuration.

6. A method of manufacturing a stator vane assembly as claimed in claim 1 wherein an outer skin is bonded to said stiffening member.

7. A method of manufacturing a stator vane assembly as claimed in claim 6 wherein the stiffening member and outer skin are so configured as to be common to two axially adjacent annular stator vane arrays, said stiffening member additionally defining a portion of a compressor casing to enclose an annular array of rotor blades operationally interposed between said adjacent stator vane arrays.

8. A method of manufacturing a stator vane assembly as claimed in claim 1 wherein said composite material comprises fibres enclosed in a resin matrix material.

9. A method of manufacturing a stator vane assembly as claimed in claim 8 wherein said resin is an epoxy resin.

10. A method of manufacturing a stator vane assembly as claimed in claim 8 wherein said fibres are of silicon carbide.

11. A method of manufacturing a stator vane assembly as claimed in claim 1 in which said stator vanes are arranged in an annular array.

12. A method of manufacturing a stator vane assembly as claimed in claim 1 wherein each of said stator vanes is formed from a material comprising reinforcing fibres in a resin matrix.

13. A method of manufacturing a stator vane assembly as claimed in claim 1 wherein said releasable fixing means comprises a low melting point alloy.

14. A stator vane assembly made in accordance with the method of claim 1.

* * * * *